(12) United States Patent
Griffin et al.

(10) Patent No.: US 10,919,617 B2
(45) Date of Patent: Feb. 16, 2021

(54) DISTRIBUTED ACCELERATION SENSING FOR ROBUST DISTURBANCE REJECTION

(71) Applicant: Aurora Flight Sciences Corporation, Manassas, VA (US)

(72) Inventors: Riley Griffin, Cambridge, MA (US); Edward Scott, Cambridge, MA (US); Sean Humbert, Cambridge, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 440 days.

(21) Appl. No.: 15/788,434

(22) Filed: Oct. 19, 2017

(65) Prior Publication Data

US 2018/0141641 A1 May 24, 2018

Related U.S. Application Data

(60) Provisional application No. 62/411,147, filed on Oct. 21, 2016.

(51) Int. Cl.
*B64C 13/16* (2006.01)
*G01C 21/16* (2006.01)
(Continued)

(52) U.S. Cl.
CPC ............... *B64C 13/16* (2013.01); *B64C 3/00* (2013.01); *G01B 7/16* (2013.01); *G01C 21/16* (2013.01);
(Continued)

(58) Field of Classification Search
CPC ......... B64C 13/16; B64C 3/00; B64C 39/024; G01C 21/16; G01C 19/5698;
(Continued)

(56) References Cited

U.S. PATENT DOCUMENTS 3,007,656 A * 11/1961 Miller .................. G05D 1/0816
244/191
3,085,443 A 4/1963 Manteuffel
(Continued)

FOREIGN PATENT DOCUMENTS

EP 2390670 A2 11/2011
EP 2390670 A3 6/2012

OTHER PUBLICATIONS

International Search Report and Written Opinion, dated May 9, 2018, in International application No. PCT/US2017/057610, filed Oct. 20, 2017.

(Continued)

*Primary Examiner* — Donald J Wallace
(74) *Attorney, Agent, or Firm* — Michael Stanley Tomsa; McAndrews, Held & Malloy, Ltd.; Eugene H. Nahm

(57) ABSTRACT

An aerial vehicle comprising an airframe, an aircraft flight controller to provide an output control signal, and a planar printed circuit board positioned on the airframe. The printed circuit board may include coupled thereto a processor, a rate gyroscope, and at least three accelerometers. The processor is configured to generate an actuation signal based at least in part on a feedback signal received from at least one of said rate gyroscope and the at least three accelerometers. The processor communicates the actuation signal to said aircraft flight controller, which is configured to adjust the output control signal based on said actuation signal.

19 Claims, 8 Drawing Sheets

(51) Int. Cl.
*G05D 1/02* (2020.01)
*B64C 3/00* (2006.01)
*G01B 7/16* (2006.01)
*G05D 1/08* (2006.01)
*G01B 11/16* (2006.01)
*B64C 39/02* (2006.01)
*G01C 19/5698* (2012.01)
*G01P 15/18* (2013.01)

(52) U.S. Cl.
CPC ......... *G05D 1/0204* (2013.01); *G05D 1/0816* (2013.01); *B64C 39/024* (2013.01); *G01B 11/18* (2013.01); *G01C 19/5698* (2013.01); *G01P 15/18* (2013.01)

(58) Field of Classification Search
CPC ...... G05D 1/0204; G05D 1/0816; G01B 7/16; G01B 11/18; G01P 15/18
See application file for complete search history.

(56) References Cited

U.S. PATENT DOCUMENTS

| | | | | |
|---|---|---|---|---|
| 4,601,206 | A * | 7/1986 | Watson | G01C 21/16 73/510 |
| 5,124,938 | A | 6/1992 | Algrain | |
| 6,122,595 | A | 9/2000 | Varley et al. | |
| 8,825,436 | B2 | 9/2014 | Zhang et al. | |
| 9,126,693 | B1 | 9/2015 | Shi et al. | |
| 2006/0058928 | A1 * | 3/2006 | Beard | G01C 23/005 701/11 |
| 2012/0056041 | A1 | 3/2012 | Rhee et al. | |
| 2014/0244078 | A1 | 8/2014 | Downey et al. | |
| 2014/0303907 | A1 | 10/2014 | Roughen et al. | |
| 2015/0225081 | A1 | 8/2015 | Stabler et al. | |
| 2015/0273351 | A1 | 10/2015 | Condon et al. | |
| 2015/0274504 | A1 | 10/2015 | Kitai et al. | |
| 2016/0009388 | A1 | 1/2016 | Brotherton-Ratcliffe et al. | |
| 2016/0200420 | A1 | 7/2016 | McKenna et al. | |
| 2016/0347462 | A1 * | 12/2016 | Clark | B64C 39/024 |

OTHER PUBLICATIONS

Marcelo C. Algrain, "Accelerometer-based platform stabilization", Proc. SPIE 1482, Acquisition, Tracking, and Pointing V, 367 (Aug. 1, 1991); doi:10.1117/12.45711.

Russell T. Rudin, "Strapdown Stabilization for Imaging Seekers," 2nd Annual AIAA SDIO Interceptor Technology Conference, Jun. 6-9, 1993 / Albuquerque, NM.

Peter J. Kennedy, "Direct Versus Indirect Line of Sight (LOS) Stabilization," IEEE Transactions on Control Systems Technology, vol. 11, No. 1, Jan. 2003.

Barton J. Bacon et al., "Reconfigurable Flight Control Using Nonlinear Dynamic Inversion with a Special Accelerometer Implementation," American Institute of Aeronautics and Astronautics, Inc., AIAA-2000-4565, 2000.

A. J. Padgaonkar et al., "Measurement of Angular Acceleration of a Rigid Body Using Linear Accelerometers," J. Appl. Mech 42(3), 552-556 (Sep. 1, 1975).

Extended European search report for EP application No. 17862992. 9, dated May 26, 2020.

* cited by examiner

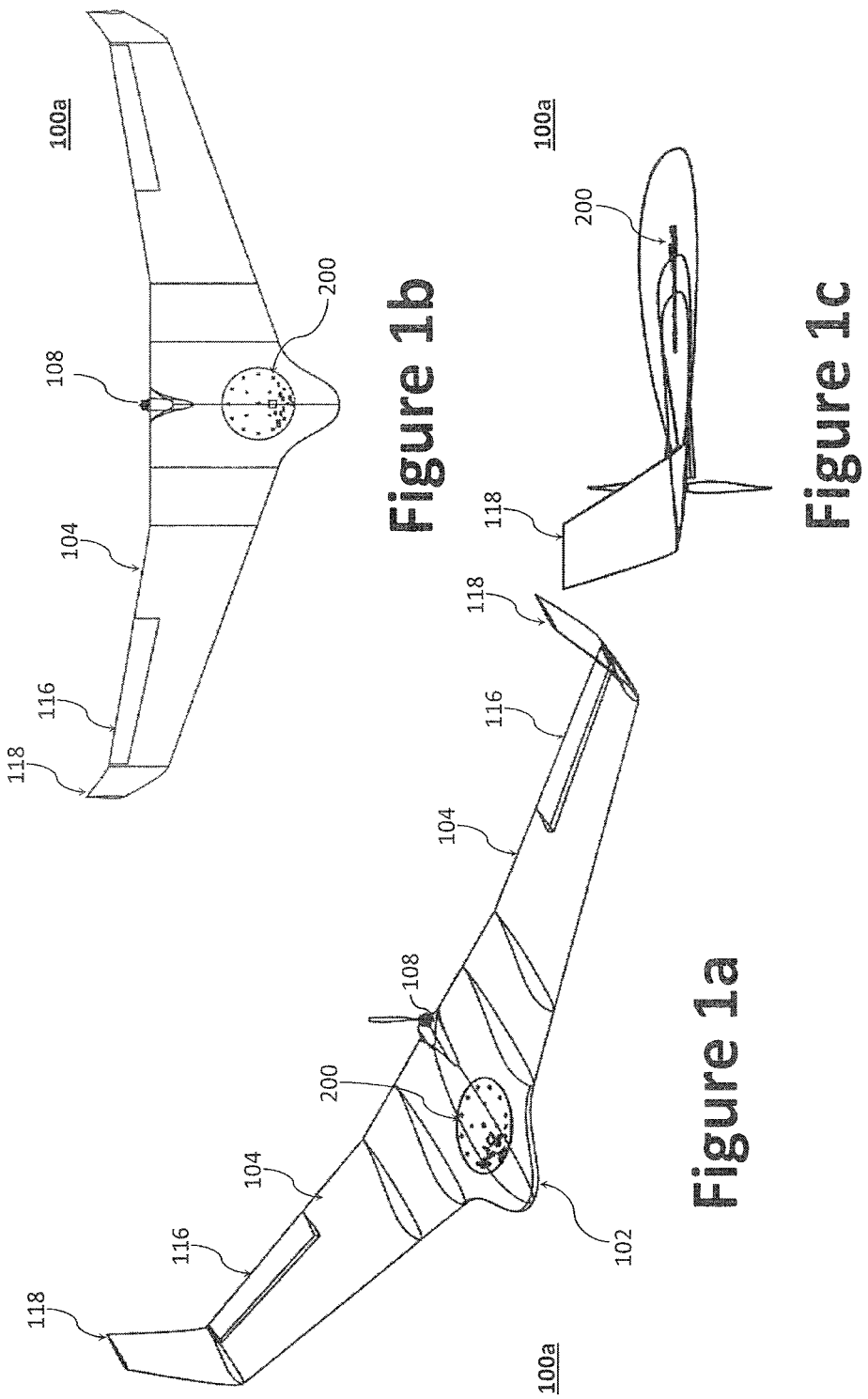

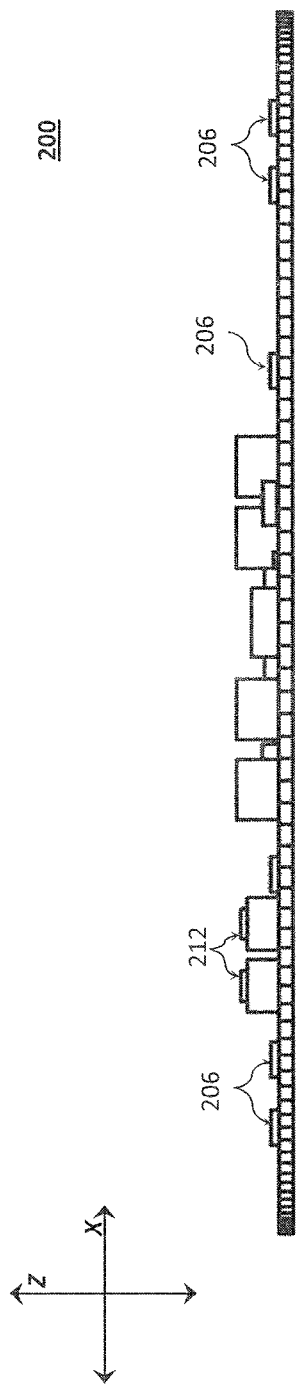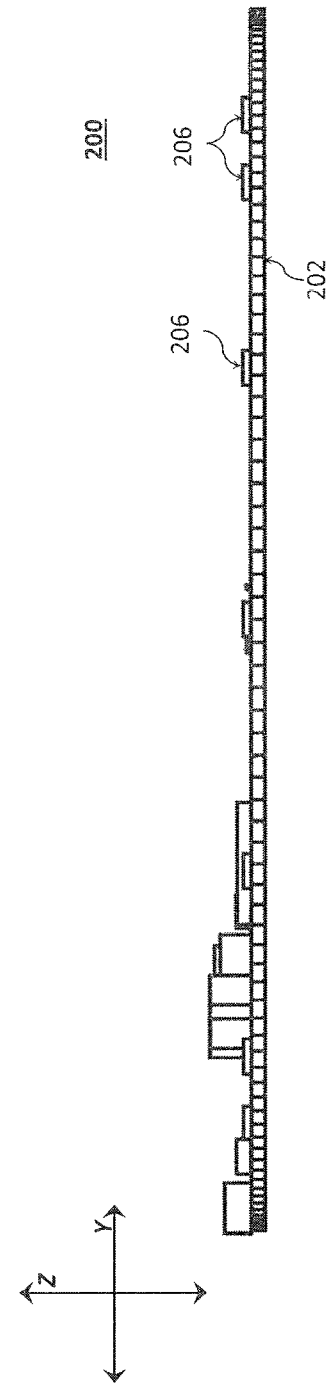

US 10,919,617 B2

DISTRIBUTED ACCELERATION SENSING FOR ROBUST DISTURBANCE REJECTION

CROSS-REFERENCE TO RELATED APPLICATION

The present application claims the benefit under 35 U.S.C. § 119(e) of provisional patent application Ser. No. 62/411,147, filed Oct. 21, 2016, the contents of which are hereby incorporated by reference.

STATEMENT OF GOVERNMENT INTEREST

This invention was made with government support under Contract Number: FA8651-13-C-0017 awarded by United States Air Force. The government has certain rights in the invention.

FIELD OF THE INVENTION

This present invention generally relates to autonomous vehicle navigation, and, more specifically, to techniques for providing gust rejection and increasing vehicle stability using proprioceptive sensing techniques.

BACKGROUND

Unmanned aerial vehicles (UAVs), small-unmanned aerial systems (sUAS), and other small aircraft, particularly those intended for use in urban or otherwise cluttered environments, face extreme constraints in regards to stability of the aircraft's state (e.g., attitude and position) when faced with atmospheric turbulence and gusts. In particular, high winds, cluttered urban environments, and proximity to other vehicles can introduce disturbances that are often difficult to reject with existing flight control technologies. Indeed, when navigating urban canyons, a 1 to 2 meter offset in course could lead to obstacle collision, mission failure, or vehicle loss. Gust rejection and vehicle stability is particularly crucial for generating clear and understandable surveillance video, a primary duty of these small aircraft. For example, UAVs are often subjected to asymmetric gusts caused by the channeling and occlusions of flow in urban canyons—flow fields unique to this environment.

While traditional inertial navigation systems (INS) are effective for vehicle stabilization, they incur an inherent lag in attitude correction, as errors must be measured before they are corrected. Further, while effective, some previously investigated proprioceptive sensing methods that use strain and pressure-based measurements require relatively complicated structural and aerodynamic modeling. For example, commonly owned U.S. Patent Publication No. 2016/0200420 to McKenna et al. titled "System and Method for Unwanted Force Rejection and Vehicle Stability" discloses techniques for providing gust rejection and increasing vehicle stability via proprioceptive sensing techniques using strain gauge embedded within the wings.

As flight vehicle capabilities are expanded to more complex missions and dynamic environments, new sensor regimes may be employed to improve robustness, survivability, and mission effectiveness. For example, the ability to actively sense disturbance forces and moments acting on the vehicle and the ability to use these sensed quantities in feedback strategies to mitigate disturbances. Consequently, small aircraft, such as UAVs and sUAS, would greatly benefit from gust rejection through increased maneuverability, expanded flight envelopes, and improved performance.

An added complication, however, is that small UAVs are often subjected to stringent requirements on gimballed payload stability and vehicle maneuverability, while also driving vehicles to smaller sizes and payload capacities. Given the tight resource constraints on small UAVs and sUAS, the challenge is not just to enable these capabilities, but also to implement them within a package that meets constraints on size, weight, and power. Therefore, gust rejection is particularly difficult to achieve on smaller platforms with the latency/noise properties of traditional attitude control inertial sensors such as gyroscopes and accelerometers (latency due to platform dynamics).

Given the demand for increased autonomy/performance and the miniaturization of the platform/sensing system, a need exists for improved systems and methods for providing gust rejection and increasing vehicle stability via, for example, bio-inspired angular acceleration sensing and other proprioceptive sensing techniques. The resultant system, as disclosed herein, may be applied to air systems ranging from vertical take-off and landing aircraft to fixed wing aircraft that are hampered by high winds, vehicle-vehicle disturbances, and unpredictable flight conditions in cluttered urban areas.

SUMMARY

Disclosed herein are improved systems and methods for providing gust rejection and increasing vehicle stability via, for example, a compact distributed acceleration-sensing package, which may include a centered rate gyroscope with accelerometers placed at distributed locations around the rate gyroscope and at a predetermined distance from the vehicle's center of gravity. The distributed acceleration sensing system provides a unique method of force and torque estimation with increased robustness and simplified implementation.

According to a first aspect, an aerial vehicle comprises: an airframe; an aircraft flight controller to provide an output control signal; and a sensor package positioned on the airframe, the sensor package comprising a rate gyroscope, a plurality of accelerometers, and a processor, wherein the sensor package configured to measure collectively at least nine independent axial acceleration measurements, wherein the processor is configured to generate an actuation signal based at least in part on a feedback signal received from at least one of said rate gyroscope and said plurality of accelerometers, wherein the processor is configured to communicate the actuation signal to said aircraft flight controller, and wherein the aircraft flight controller is configured to adjust the output control signal as a function of said actuation signal.

According to a second aspect, a distributed acceleration sensing system for an aerial vehicle comprising: a planar printed circuit board; a rate gyroscope coupled to the planar printed circuit board; a plurality of accelerometers coupled to the planar printed circuit board, wherein the plurality of accelerometers collectively measure at least three axial acceleration measurements taken at three different locations for each axis to yield at least nine independent axial acceleration measurements; and a processor coupled to the planar printed circuit board, wherein the processor is operatively coupled with the rate gyroscope and each of the plurality of accelerometers and configured to generate an actuation signal based at least in part on a feedback signal received from at least one of said rate gyroscope and said at least three accelerometers, wherein the processor communicates the actuation signal to an aircraft flight controller of said aerial vehicle.

According to a third aspect, an aerial vehicle comprises: an airframe; an aircraft flight controller to provide an output control signal; and a planar printed circuit board positioned on the airframe, the printed circuit board having coupled thereto a processor, a rate gyroscope, and at least three accelerometers, wherein the processor is configured to generate an actuation signal based at least in part on a feedback signal received from at least one of said rate gyroscope and said at least three accelerometers, wherein the processor communicates the actuation signal to said aircraft flight controller, wherein the aircraft flight controller is configured to adjust the output control signal based on said actuation signal.

According to a fourth aspect, a distributed acceleration sensing system for an aerial vehicle comprises: a planar printed circuit board; a rate gyroscope coupled to the planar printed circuit board; at least three accelerometers coupled to the planar printed circuit board; and a processor coupled to the planar printed circuit board; wherein the processor is configured to generate an actuation signal based at least in part on a feedback signal received from at least one of said rate gyroscope and said at least three accelerometers, wherein the processor communicates the actuation signal to an aircraft flight controller of said aerial vehicle, thereby causing the aircraft flight controller is configured to adjust its output control signal based on said actuation signal.

In certain aspects, the rate gyroscope and the at least three accelerometers reside substantially in the same plane.

In certain aspects, the aircraft flight controller is configured to provide the output control signal to a propulsor or a flight control surface.

In certain aspects, the rate gyroscope is positioned substantially at the center of gravity of the airframe.

In certain aspects, each of said at least three accelerometers is positioned away from the center of gravity of the airframe.

In certain aspects, each of said at least three accelerometers is positioned a predetermined distance from the center of gravity of the airframe.

In certain aspects, each of said at least three accelerometers is equidistant from the rate gyroscope.

In certain aspects, said at least three accelerometers are arranged in a circle with the rate gyroscope positioned substantially at the center of said circle.

In certain aspects, twelve accelerometers are arranged in a circle with the rate gyroscope positioned substantially at the center of said circle.

In certain aspects, the processor is configured to estimate translational and rotational acceleration of the airframe based on the feedback signal to generate the actuation signal.

In certain aspects, the processor is configured to receive a feedback signal from a strain gauge embedded within the aerial vehicle.

In certain aspects, the aerial vehicle comprises a wing and the strain gauge is embedded in the wing.

In certain aspects, said strain gauge is a fiber optic strain gauge embedded within a groove of said wing.

In certain aspects, the strain gauge is embedded at a leading edge of said wing.

In certain aspects, the processor is configured to calibrate the feedback signal using an estimation algorithm.

In certain aspects, the estimation algorithm is chosen from a group consisting of: least squares; maximum likelihood estimation; and linear quadratic estimation.

In certain aspects, each of said at least three accelerometers is a microelectromechanical system accelerometer.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead being placed upon illustrating the principles of the devices, systems, and methods described herein.

FIG. 1a illustrates a perspective view of an exemplary fixed wing aircraft having a distributed acceleration sensing system.

FIG. 1b illustrates a top plan view of the exemplary fixed wing aircraft of FIG. 1a.

FIG. 1c illustrates a side view of the exemplary fixed wing aircraft of FIG. 1a.

FIG. 2b illustrates a top plan view of the example printed circuit board assembly of FIG. 2a.

FIG. 2c illustrates a first side view of the example printed circuit board assembly of FIG. 2a.

FIG. 2d illustrates a second side view of the example printed circuit board assembly of FIG. 2a.

DETAILED DESCRIPTION

Figure 1E:
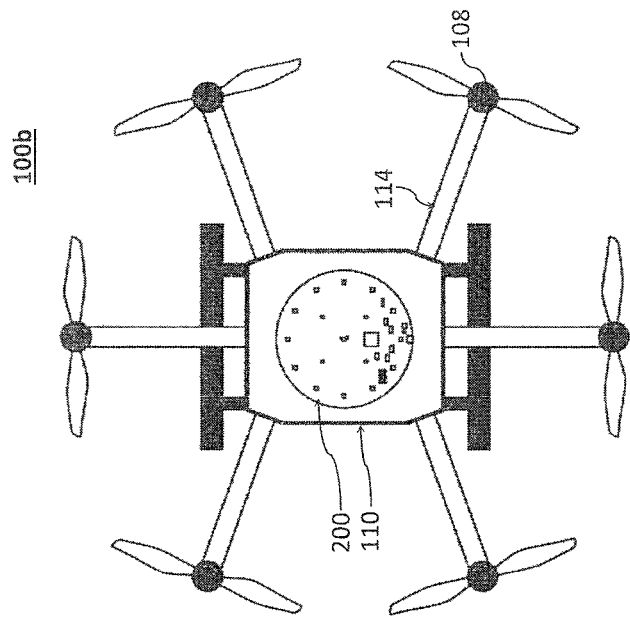
FIG. 1e illustrates a top plan view of the exemplary multirotor aircraft of FIG. 1d.

Preferred embodiments of the present invention will be described hereinbelow with reference to the accompanying drawings. In the following description, certain well-known functions or constructions are not described in detail since they would obscure the invention in unnecessary detail. The present invention is generally directed to a bio-inspired sensing approach that involves placing a rate gyroscope at or adjacent the airframe's center of gravity and a plurality of accelerometers away from the airframe's center of gravity. By fusing the measured acceleration components, force, and torque on the airframe can be estimated directly to enable a novel disturbance rejection controller.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein.

The terms "about" and "approximately," when used to modify or describe a value (or range of values), mean reasonably close to that value or range of values. Thus, the embodiments described herein are not limited to only the recited values and ranges of values, but rather should include reasonably workable deviations thereof.

The terms "aerial vehicle" and "aircraft" refer to a machine capable of flight, including, but not limited to, traditional aircraft and vertical take-off and landing (VTOL) aircraft.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y, and z".

The terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code.

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

The term "exemplary" means serving as a non-limiting example, instance, or illustration. As utilized herein, the terms "e.g." and "for example" set off lists of one or more non-limiting examples, instances, or illustrations.

As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

An objective of the present disclosure is to provide a novel aircraft and aircraft sensor system that incorporate bio-inspired actuation and articulation concepts. To that end, disclosed herein is a distributed acceleration sensing system that provides fast and robust disturbance rejection for small aerial vehicle using feedback control techniques. As discussed below in detail, a distributed acceleration sensing system enables direct sensing and feedback of angular acceleration to improve vehicle flight performance compared to traditional angular rate-based sensing and control. This is accomplished by reducing measurement latencies and using feedback to provide robustness to aerodynamic uncertainties. That is, the distributed acceleration sensing system may implement a feedback loop on the actual force or moment output to provide higher bandwidth rejection of gusts and other disturbances. In certain aspects, the distributed acceleration sensing system may be configured as a compact and vehicle agnostic platform, whereas existing sensor packages (e.g., on-wing strain measurements and wing-embedded pressure sensors) are not vehicle agnostic and can require complicated structural/aerodynamic modeling to extract forces and torques.

The distributed acceleration sensing system may employ a unique technique of distributing accelerometers about the airframe's center of gravity to estimate the angular acceleration acting on the airframe. For instance, a distributed acceleration sensing system can be fabricated using a rate gyroscope and a plurality of linear accelerations (e.g., three of more) bundled into a mass-producible printed circuit board (PCB) assembly. The measured angular accelerations are used to estimate directly the forces and torques on the airframe, thereby enabling a shift from traditional rate-based controllers to more accurate state estimation and faster disturbance rejection. As a result, platforms that integrate the distributed acceleration sensing system will benefit from expanded flight envelopes to enable wider deployment in rough/urban terrain and reducing assets grounded due to weather. Additional bio-inspired sensing systems and control schemes, such as those disclosed in commonly owned U.S. Patent Publication 2016/0200420 to McKenna et al., may be incorporated with the distributed acceleration sensing system to further yield a robust foundation for the angular distributed acceleration sensing technology.

Aircraft Designs. The distributed acceleration sensing system employs a feedback system to provide a significant increase to aircraft robustness in an expanded flight envelope, thereby allowing for wider mission variety, rapid deployment, and reliable performance. A benefit to distributed acceleration sensing is its applicability to a variety of vehicle platforms. For example, angular acceleration feedback and control can be applied to a rigid body with fast dynamics (e.g., a multirotor aircraft), but fixed wing aircraft would also benefit from sensors integrated with the fuselage and could even extract aeroelastic information (e.g., flutter measurements from the wings). Consequently, the distributed acceleration sensing system can be readily integrated into both fixed wing aircraft 100*a* and multirotor aircraft 100*b*, thereby enabling both legacy and new airframes alike to fly in more challenging and varied environments. For instance, a distributed acceleration sensing system may be integrated with a fixed wing aircraft 100*a* as illustrated in FIGS. 1*a* through 1*c*, or a multirotor aircraft 100*b* (a form of VTOL aircraft) as illustrated in FIGS. 1*d* and 1*e*.

As illustrated in FIGS. 1*a* through 1*c*, fixed wing aircraft 100*a* may employ a flying wing design generally comprising a fuselage portion 102 and two wings 104 (together defining a wing set). While not illustrated, an empennage may be situated at the aft end of the fixed wing aircraft 100*a*. The fixed wing aircraft 100*a* also includes one or more propulsors 108 coupled to, for example, the wings 104 and/or, as illustrated, the fuselage 102. The propulsor 108 may be arranged in a tractor configuration or, as illustrated, a pusher configuration. A propulsor refers to a mechanical device that gives propulsion and/or thrust to the aircraft including, without limitation, a motor/engine-driven propellers, jet or turbine engines, vectoring motor pods, etc. For example, commonly owned U.S. Pat. No. 8,951,086 to Adam John Woodworth et al. titled "Modular Miniature Unmanned Aircraft With Vectored-Thrust Control" discloses a suitable thrust-vectoring module that provides propulsion forces to an aerial vehicle.

The wings 104 may employ one or more control surfaces 116, such as a single conventional aileron configuration or, in the alternative, a plurality of span-wise distributed, independently actuated, ailerons (e.g., wing-borne control surfaces), or flaperons, which is a type of aircraft control surface that combines aspects of both flaps and ailerons. The flaperon may incorporate one or more types of flaps or flap features, including, without limitation, plain, split, slotted, Fowler, Junkers Flap Gouge, Fairey-Youngman, Zap, Krueger, Gurney, and, in certain aspects, leading edge flaps, such as leading edge droop and blown flaps. A winglet 118 may be provided at the distal end of each wing 104 to, inter alia, improve aircraft handling characteristics, enhance safety, and improve efficiency of the fixed wing aircraft 100a. The wings 104 may further utilize a continuous set of sensors (e.g., strain/torque measurement sensors) along the wing 104 to manipulate the span-wise, continuous, trailing edge surface (e.g., the flaperons), much in the way a bird is known to alter its wing shape.

Figure 1D:
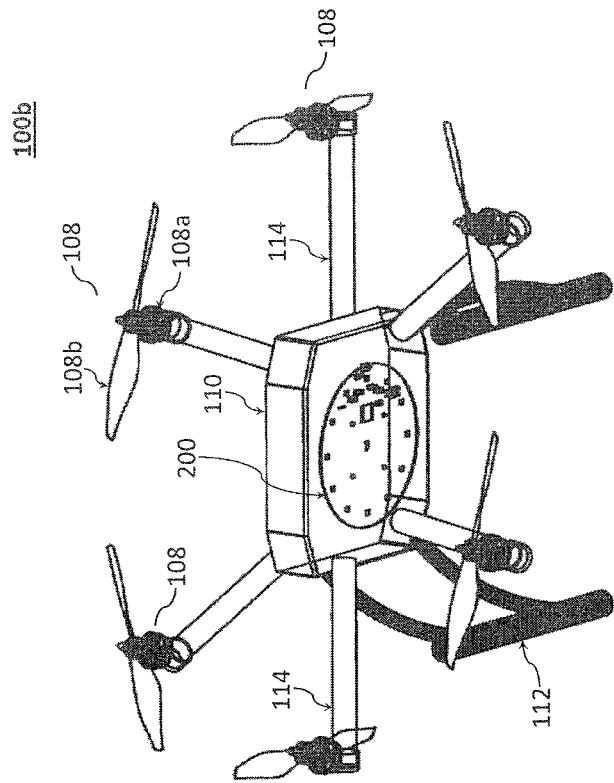
FIG. 1d illustrates a perspective view of an exemplary multirotor aircraft having a distributed acceleration sensing system.
Figure 2A:
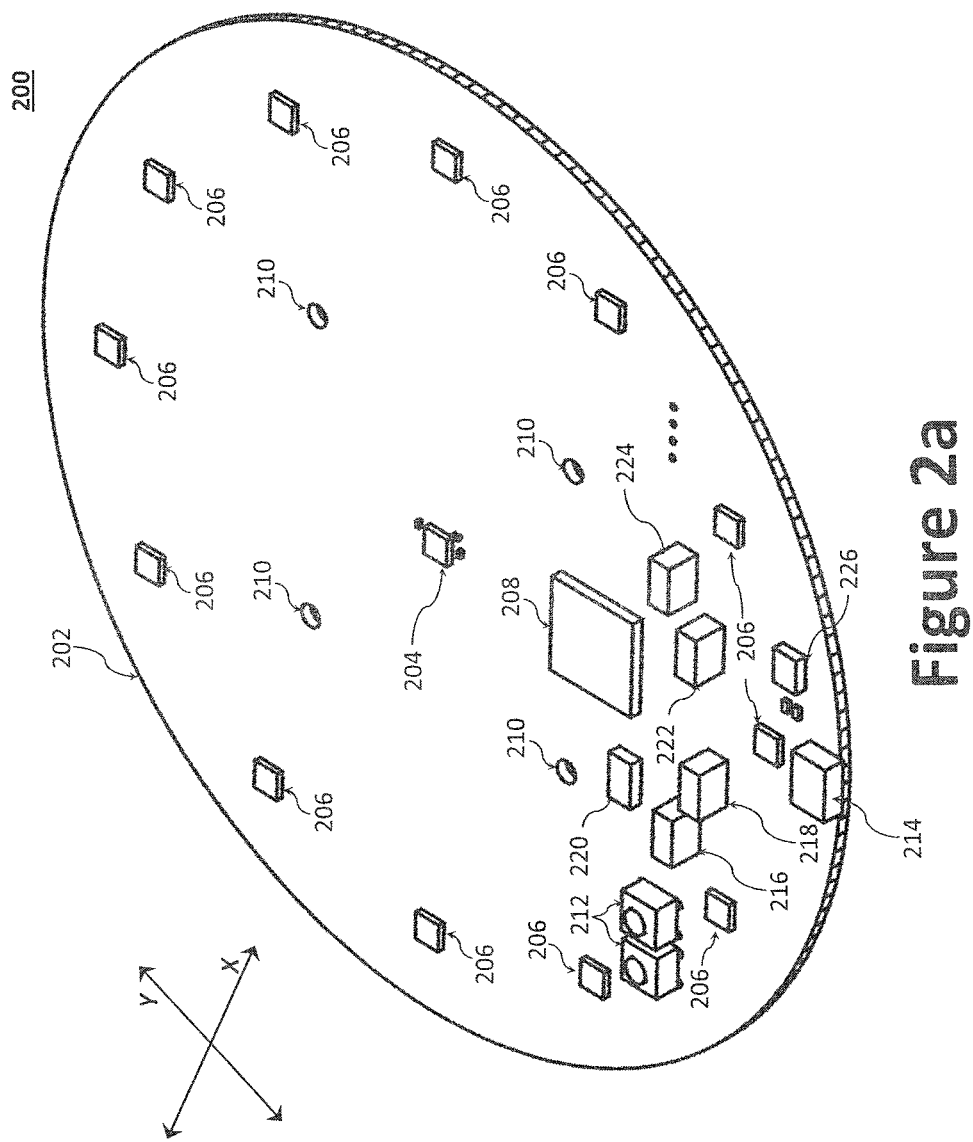
FIG. 2a illustrates a perspective view of an example printed circuit board assembly embodying a distributed acceleration sensing system.
Figure 2B:
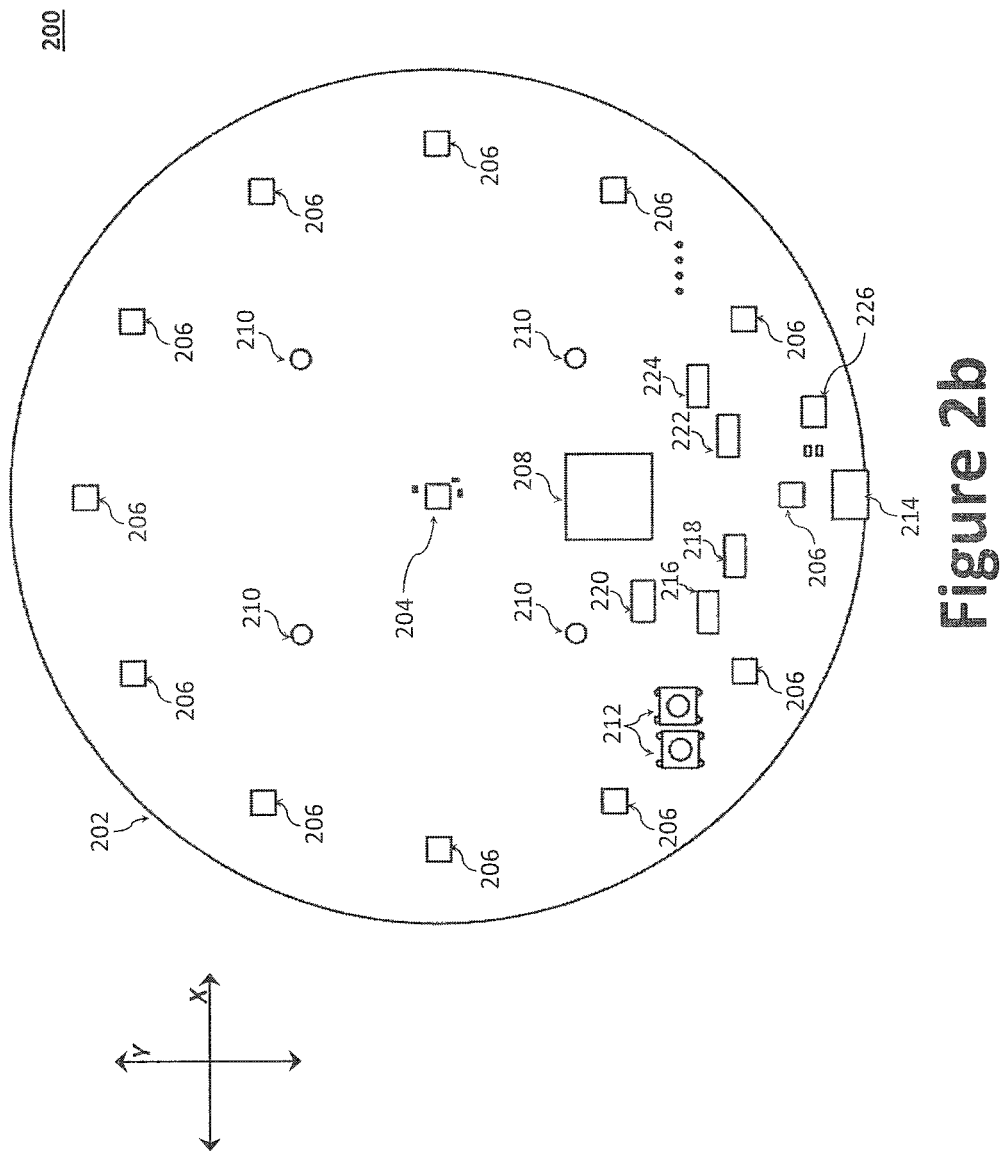

As illustrated in FIGS. 1d and 1e, a multirotor aircraft 100b (a form of VTOL aircraft) generally comprises a fuselage 110, a plurality of longitudinal booms 114 extending radially from the fuselage 110, a set of landing skids 112, and a plurality of propulsors 108 (e.g., as illustrated, a rotor 108a having a motor/engine-driven propeller 108b). Each of said plurality of propulsors 108 are placed at a distal end of a longitudinal boom 114 and oriented to direct thrust downward (relative to the vehicle). The multirotor aircraft 100b includes a rigid airframe, which makes them particularly suitable for angular acceleration feedback. While the multirotor aircraft 100b is illustrated as having six propulsors 108, a person of skill in the art would recognize that additional, or fewer, propulsors 108 may be employed.

Regardless of the aircraft type, the distributed acceleration sensing PCB assembly 200 communicates (e.g., via the processor 208 and a communication interface) an actuation signal to said aircraft flight controller, which in turn causes the aircraft flight controller to adjust an output control signal to the propulsor(s) 108 and/or flight control signal based on said actuation signal. The aircraft flight controller, which is not illustrated, may be mounted on top of the PCB assembly 200 (e.g., via one or more mounting holes 210). The actuation signal, which is a digital or analog signal generated based on measurement data and predictions, may be provided to an aircraft flight controller (whether or not autopilot is employed) early in the sequence of events. Accordingly, the actuation signal is provided to the aircraft flight controller before force and displacement of the aircraft occurs, thus allowing the control system to essentially cancel, or offset, the effect of gusts (e.g., by creating a counterforce or maneuver). The output control signal from the aircraft flight controller may be a digital or analog signal operable to, for example, cause the propulsor 108 to throttle its thrust output or its thrust direction. The output control may also, or in the alternative, cause a flight control surface 116 to adjust via a flight control surface actuator (e.g., one or more actuators coupled to the flight control surface 116).

For instance, consider a non-uniform wind gust that causes the local angle of attack on the right wing to be different from that on the left wing. This difference in angle of attack causes (after some delay) a change in wind circulation on each wing, which results in a rolling moment. The aerial vehicle begins to accelerate in the roll axis, reaching a steady-state roll rate and achieving a non-negligible roll attitude after a few roll subsidence time constants. Thus, there is a second order response between rolling moment and roll attitude, followed by another second-order response between the side force generated by the tilted wing and the actual displacement of the vehicle from its original path. Typical control laws will measure roll attitude and displacement from the desired path and correct these values to maintain track—this latency between actual aircraft positional changes and changes in the inertial navigation system (INS) measurements may be too late for effective control. A control system having acceleration sensing functionality could react directly to the changes in angle of attack, producing a countervailing moment before any significant roll attitude or side displacement occurs.

The distributed acceleration sensing system may be incorporated with either the fixed wing aircraft 100a or the multirotor aircraft 100b as a bundled distributed acceleration sensing PCB assembly 200. The distributed acceleration sensing PCB assembly 200 may be positioned on the fuselage 102, 110 and arranged to coincide (e.g., overlap) at least in part with the center of gravity of the airframe—i.e., the mechanical structure of the aircraft 100a, 100b minus the propulsors. For example, the combination of the fuselage 102, wings 104, and empennage (where applicable) may define the airframe of the fixed wing aircraft 100a, while the combination of the fuselage 110 and longitudinal booms 114 may define the airframe of multirotor aircraft 100b.

The fixed wing aircraft 100a and multirotor aircraft 100b may further include landing gear (e.g., nose-end landing gear and main landing gear, in the case of fixed wing aircraft 100a, or a set of landing skids 112 in the case of the multirotor aircraft 100b), armament, and one or more sensors to facilitate autonomous flight. The one or more sensors include, without limitation, ultrasonic sensors, infrared sensors, radar, LIDAR (light imaging, detection, and ranging), thermal cameras (e.g., FLIR), and the like. To collect data and monitor an area, the fixed wing aircraft 100a and multirotor aircraft 100b may be equipped with a traditional intelligence, surveillance, and reconnaissance (ISR) payload. For example, the fixed wing aircraft 100a and multirotor aircraft 100b may be equipped with a payload pod comprising one or more cameras, audio devices, and other sensors. Any video, image, audio, telemetry and/or other sensor data collected by the aircraft 100a, 100b may be stored locally or communicated wirelessly from the aircraft 100a, 100b a remote location (e.g., a ground control station) in real time using an antenna coupled with an onboard wireless communication device, such as a transmitter/receiver. Alternatively, such information may be communicated, or otherwise transferred, to the remote location or another party via a wired connection (e.g., if the aircraft is tethered or landed).

Distributed Acceleration Sensing System. An advantage of the distributed acceleration sensing technology is the ability to employ existing sensors technologies in a new manner to facilitate a novel sensing modality. Existing sensor configurations are not vehicle agnostic, require substantial space on the vehicle, and are difficult to package as an integrated sensor suite. Moreover, many accelerometers currently on the market are not suitable for use aboard small-unmanned aircraft due to size, weight, power, and cost limitations. Further, traditional aircraft flight control is limited to loops that perform estimation and control based on the measured body x-, y-, and z-axis accelerations and/or the body x-, y-, and z-axis angular velocities. The body x-, y-, and z-axis accelerations and angular velocities may be measured by an accelerometer and a gyro respectively, both located at the center of gravity of the aircraft.

A sensor configuration in accordance with the distributed acceleration sensing system, however, provides a compact vehicle agnostic sensor configuration that incorporates the accelerometers 206 into a PCB 202 that easily mounts onto, for example, fixed wing aircraft 100a and multirotor aircraft 100b. By placing an accelerometer at a fixed distance from the center of gravity, acceleration measurements from the accelerometer would also contain information about the aircraft's angular acceleration. Feedback of such angular acceleration to the aircraft flight controller enables tighter control and increased robustness to internal and external uncertainties. Indeed, the acceleration sensing feedback system demonstrates: (1) improved rejection of disturbances and gusts through feedback of angular acceleration components; (2) that angular acceleration feedback can eliminate the need for separate angle of attack and sideslip sensors/measurements; and (3) that feedback of angular acceleration provides improved robustness to uncertainties in the aerodynamic models of the plant and actuators.

The distributed acceleration sensing system may employ microelectromechanical system (MEMS) sensors to reduce the effect of noise and bias in a single low-cost, ready to integrate package. Indeed, MEMS-based accelerometers are small, accurate, and readily available. The angular acceleration feedback may be fed to the aircraft autopilot controllers to enable a robust sensing modality adaptable to a variety of aircraft.

FIGS. 2a through 2d illustrates an exemplary distributed acceleration sensing PCB assembly 200 embodying distributed acceleration sensing technology. For simplicity, the aircraft flight controller is not illustrated, but may be mounted atop the PCB assembly 200. The distributed acceleration sensing PCB assembly 200 may include a rate gyroscope 204 and a plurality of accelerometers 206 arranged on a PCB 202 on a single plane (i.e., the surface of the PCB 202 defines an X-Y plane). The PCB 202 may further comprise a processor 208, one or more mounting holes 210 (e.g., to mount the PCB 202 to the airframe or the aircraft flight controller to the PCB 202/airframe), one or more push buttons 212, and other components such as a memory device, signal processing components, and sensors. The one or more push buttons 212 may be used to, for example, power on or off the PCB assembly 200, reset the PCB assembly 200, etc. Further, a Universal Serial Bus (USB) Port 214 may be provided to facilitate wired communication of the acceleration sensing PCB assembly 200 with another device (e.g., a computer). For example, the acceleration sensing PCB assembly's 200 software may be upgraded or reconfigured via a computer coupled to the USB Port 214. That is, a computer may transfer updated software to the acceleration sensing PCB assembly 200 via the USB Port 214. Similarly, information saved to a memory device of the acceleration sensing PCB assembly 200 may be accessed, copied, or updated. In addition to vehicle interfaces to interface with the aircraft (e.g., the aircraft flight controller), the acceleration sensing PCB assembly 200 may comprise a plurality of expansion interfaces to facilitate the inclusion of additional features or integration with other hardware. For example, the acceleration sensing PCB assembly 200 may comprise, inter alia, a first universal asynchronous receiver/transmitter (UART) 216 to provide a vehicle interface, a second UART 218 to provide an expansion interface, a linear power regulator 220, a first inter-integrated circuit (i2c) port 222 to provide another vehicle interface, a second i2c port 224 to provide another expansion interface, and/or a USB to UART bridge 226.

The distributed acceleration sensing PCB assembly 200 includes a processor 208 operably coupled to the rate gyroscope 204, each of the plurality of accelerometers 206, a memory device having acceleration sensing software installed thereon, and, where applicable, other components of the PCB 202. The processor 208 is configured to execute a feedback process and to generate an actuation signal for the aircraft flight controller based at least in part on feedback signals received from the rate gyroscope 204 and/or the plurality of accelerometers 206. In operation, the processor 208 performs distributed acceleration sensing methods and feedback processes, which may be stored to the memory device. The distributed acceleration sensing PCB assembly 200 may further receive feedback signals from other sensors, such as pressure sensors and/or strain gauges (e.g., strain gauges on the wings 104).

The rate gyroscope 204 provides a faster response rate compared to other types of gyroscopes, typically at a relatively lower cost. A rate gyroscope 204 differs from other types of gyroscopes in that it indicates the rate of change of angle with time rather than indicating a direction. For example, a MEMS gyro, a form of rate gyroscope 204, works by sonic resonance effects driven by piezoelectric transducers that provide a signal when a rotation occurs.

The rate gyroscope 204 is positioned on the PCB 202 such that, when installed on an aircraft, the rate gyroscope 204 coincides with the center of gravity of the airframe of the aircraft. That is, the rate gyroscope 204 may be positioned to align, at least in part with the center of gravity of the airframe. The center of gravity of the airframe may be determined using known techniques (e.g., using computer-aided design (CAD) software or using known mathematical equations). As can be appreciated by those of ordinary skill in the art, the term center of gravity generally refers to a point at which, if the airframe were suspended, it would be balanced in all positions—i.e., airframe's hypothetical balancing point in all directions. While the rate gyroscope 204 is preferably positioned to align with the center of gravity of the airframe, the rate gyroscope 204 may be positioned at a known point elsewhere on the PCB 202 X-Y plane, where the processor is configured to account mathematically for the off-center deviation from the center of gravity of the airframe.

As illustrated, the rate gyroscope 204 may be positioned such that it is at the center (as defined in an X-Y plane) of the illustrated circular PCB 202, though other shapes are contemplated. More specifically, the rate gyroscope 204 is positioned at the center of the PCB 202 such that it is equidistant from each of a plurality of accelerometers 206. However, the rate gyroscope 204 need not be equidistant from the plurality of accelerometers 206. Notably, incorporating measurements from the rate gyroscope 204 into the sensor fusion estimation software enables placement of all accelerometers 206 in a planar configuration (e.g. on a single PCB). Exemplary suitable accelerometers 206 may include tri-axial linear accelerometers that measure acceleration simultaneously in three axes and linear accelerometers to measure linear acceleration in a single axis. When a tri-axial linear accelerometer is used as the accelerometers 206, at least three tri-axial linear accelerometers are needed. Alternatively, a single-axis linear accelerometer may be used, however at least nine single-axis linear accelerometers would be needed. Therefore, the plurality of accelerometers collectively gather at least three axial acceleration measurements (e.g., x, y, and z axes) at three different locations (e.g., locations a, b, and c) for each axis, resulting in a total of nine independent axial acceleration measurements (e.g., $x_a$, $x_b$, $x_c$, $y_a$, $y_b$, $y_c$, $z_a$, $z_b$, and $z_c$). In other words, the plurality of accelerometers captures acceleration for all three axes at three separate locations.

Each of the plurality of accelerometers 206 are arranged on a PCB 202 at a predetermined distance from the airframe's center of gravity. A greater distance from the center of gravity to the accelerometer 206 yields a more accurate measurement for that accelerometer 206. In other words, the accelerometers 206 should be positioned as far from the airframe's center of gravity as is possible, while still mounting them on the rigid body (e.g., the airframe). Mounting the accelerometers 206 on the rigid body is advantageous over non-rigid bodies, such as the wing 104, which is typically flexible and therefore it would yield measurements from the accelerometers 206 that are influenced by aeroelastic effects.

Employing an increased number of accelerometers 206 (e.g., more than three tri-axial linear accelerometers or more than nine single-axis linear accelerometers), however, improves the quality of the estimate by introducing a larger number of measurements of the same quantities. That is, a more accurate the measurement can be achieved through a greater number of accelerometers 206. Further, such redundancy reduces the effect of individual sensor noise, which has historically shown to be a debilitating problem when employing MEMS accelerometers at high bandwidth. In certain aspects, a combination of tri-axial and single-axis linear accelerometers may be employed, so long as measurements are gathered along at least nine axes (i.e., 3 sets of X, Y, Z measurements at 3 independent, or unique, locations). While twelve tri-axial accelerometers 206 are illustrated, a person of skill in the art would recognize that additional, or fewer, accelerometers 206 may be employed. For example, 3 to 30 tri-axial accelerometers 206, 10 to 20 tri-axial accelerometers 206, or 12 tri-axial accelerometers 206 (as illustrated) may be used.

While the plurality of accelerometers 206 are illustrated as being equidistance from the rate gyroscope 204 and the center of gravity (i.e., positioned in a circle along the circumference of the PCB 202), the plurality of accelerometers 206 need not be equidistant. The distance between the center of gravity of the airframe and each of the accelerometers 206, however, must be known such that it can be accounted for during signal processing by processor 208. The position and orientation of the accelerometers 206 with respect to an airframe reference axis enables the embedded software to estimate the translational and rotational accelerations about the airframe's center of gravity. While the orientation of the accelerometers 206 is illustrated as being axial, other orientations are possible because the measurements from the accelerometers 206 may be adjusted, or otherwise accounted for, using trigonometry.

The distributed acceleration sensing PCB assembly 200 may further receive inputs (e.g., raw sensor signals as feedback signals) from one or more other sensors, including embedded electronics, to facilitate sensor integration and computations to generate a filtered actuation signal. The filtered actuation signal may then be communicated to an aircraft flight controller to provide an output control signal to a propulsor, flight control surface, or other aircraft component. Therefore, the PCB 202 may further comprise one or more integrated electronic sensors. In addition to, or in lieu of, the integrated electronic sensors, the distributed acceleration sensing PCB assembly 200 may be communicatively coupled to one or more sensors positioned throughout the aircraft. For example, the processor 208 may process signals from a plurality of sensors (e.g., strain gauges) positioned along the leading edge of the wing or one or at connection points between the various aircraft components to detect strain or torque. For additional information, see, for example, commonly owned U.S. Patent Publication 2016/0200420 to McKenna et al.

Incorporating measured or modeled mass and inertia properties of a rigid body (e.g., the airframe), to which the distributed acceleration sensing PCB assembly 200 is attached, allows body forces and torques to be directly estimated from the sensor-derived linear and angular accelerations. For example, if the mass and inertial properties of the aircraft (m) are known, the translational and rotational forces (F) can be mathematically determined (i.e., F=ma) by measuring the aircraft accelerations (a). Moreover, the mass and inertia properties are useful for tuning gains for the feedback controller. That is, a reaction to a gust may be dictated in part by the aircraft dynamics.

Each sensor's characteristic parameters may be calibrated using one or more sensor fusion estimation algorithms, such as least squares, maximum likelihood estimation, linear quadratic estimation (e.g., Kalman filtering), etc. Output error parameter estimation techniques can be employed to dynamically estimate accelerations on the rigid body.

Figure 3A:
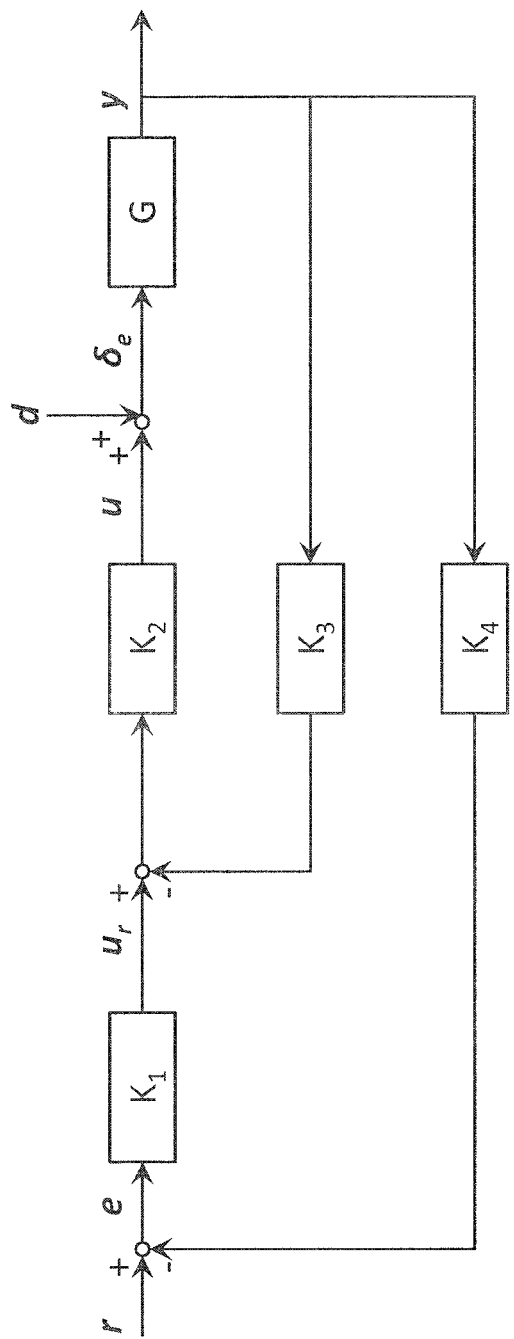
FIGS. 3a and 3b illustrate exemplary acceleration sensing feedback frameworks for distributed acceleration sensing.
Figure 3B:
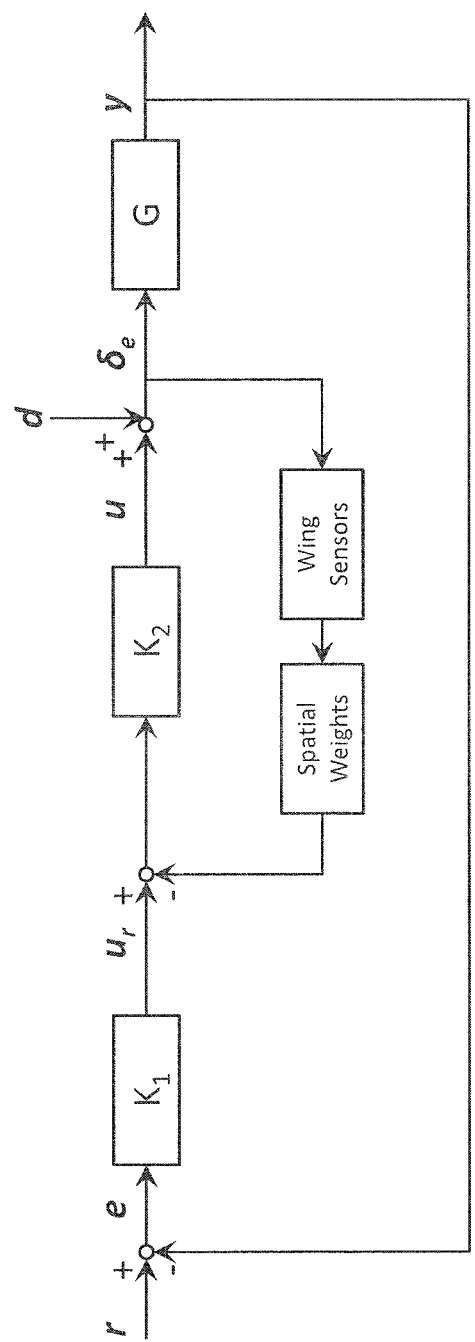
Figures 4A, 4B:
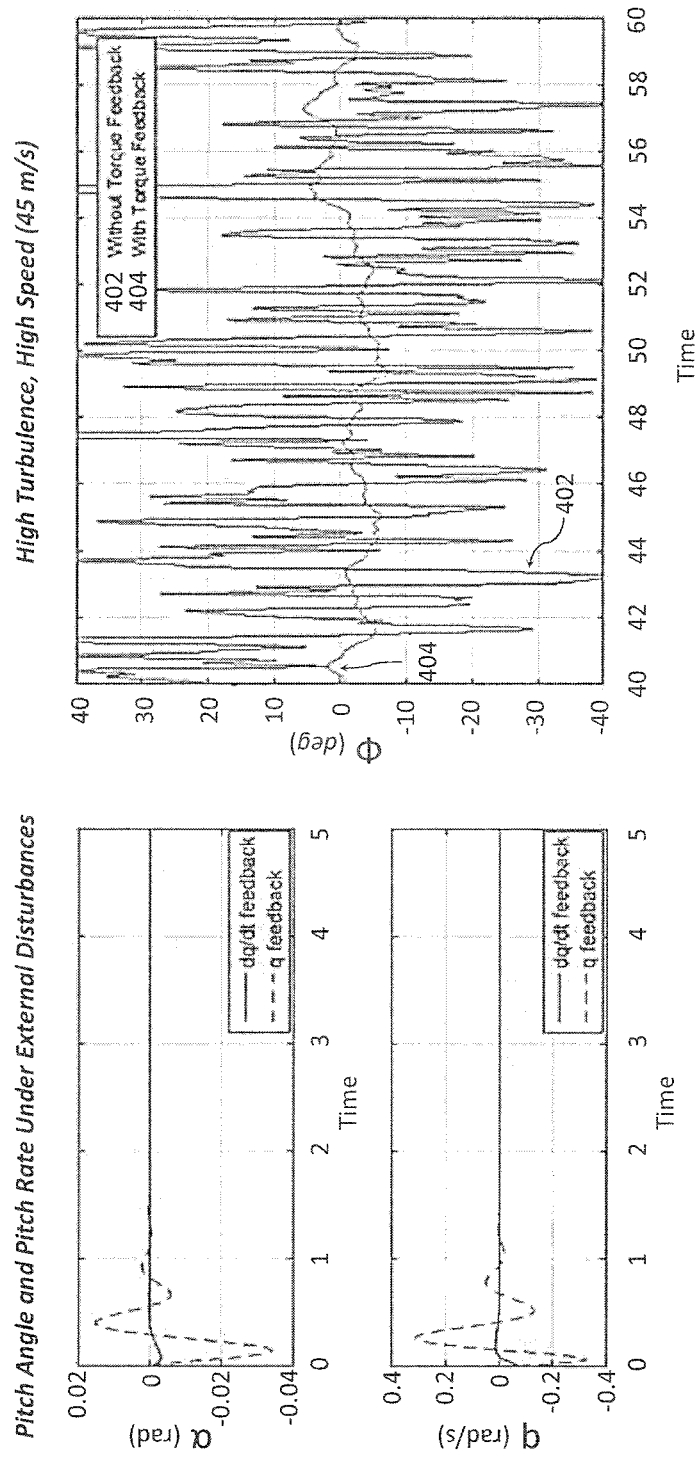
FIG. 4a is a graph illustrating angular acceleration feedback for a generic rigid body missile airframe.
FIG. 4b is a graph illustrating torque feedback of a small unmanned aircraft system.

Acceleration Sensing Feedback. FIGS. 3a and 3b illustrate two exemplary acceleration sensing feedback frameworks for bio-inspired control strategy using, for example, distributed acceleration sensing and/or on-wing sensing to provide feedback of force, torque, or angular acceleration. As illustrated, each framework involves adding a fast inner loop that uses force, torque, and/or angular acceleration feedback in addition to the conventional angle and rate feedbacks. Here G represents the flight dynamics (lateral or longitudinal), y represents the measurements that are available for feedback, r represents the commanded acceleration (either vertical acceleration, $a_n$ or lateral acceleration, $a_y$), and d represents unknowns (e.g., disturbances). A feature of an inner loop is its simplicity, which allows for its implementation in a variety of vehicles with minimal tuning. The block $K_3$ specifies the feedback gain on the output and any additional filtering, the block $K_4$ selects the output to be regulated, the block $K_1$ represents PI control, and $K_2$ includes the force/torque feedback control and any actuator dynamics. As illustrated in FIG. 4b, the inner loop enables the system to use spatial weighting patterns to convert instantaneous sensor readings to feedback commands. The design of the spatial weighting patterns enables the system to generate responsive force and moment commands. An integrator in the inner loop may further provide robustness to torque biases, disturbances, and vehicle configuration changes, yielding a biomimetic fault tolerance.

Experimentation through simulation indicates that the addition of acceleration sensing feedback results in reduced attitude error and improved tracking performance. For example, simulations for two distinct example airframes demonstrate improved tracking performance of both pitch angle α (rad) and pitch rate q (rad/s) and improved roll angle stability in turbulence. FIG. 4a shows a longitudinal flight controller for a standard rigid body missile subjected to a disturbance at time 0 (i.e., t=0). As illustrated, tracking of both pitch angle α and pitch rate q is drastically improved with the addition of angular acceleration feedback (dq/dt). Indeed, such feedback allows for more aggressive cost functions when tuning controller gains. Moreover, angular acceleration feedback improves robustness to both internal (modelling limitations) and external (environmental disturbances) uncertainty. Likewise, FIG. 4b shows the roll angle Φ of a basic attitude controller for an 11 kg small-unmanned aircraft system with a wingspan of 2.9 meters and a wing aspect ratio of 15. At a nominal speed of 45 meters per second (m/s) and high turbulence conditions (using the Dryden gust model), direct feedback of angular acceleration-based torque measurements significantly improves the vehicle's ability to reject environmental disturbances, including the high frequency content of the disturbances.

Lower frequency drift of the roll attitude can be mitigated through rate/angular error feedback.

Distributed acceleration measurements allow for the separation of the angular from the translational components with the potential to apply each separately as feedback, providing a fast, low-latency inner loop with superior levels of gust rejection, disturbance attenuation and improved platform performance. Specifically, an approach of distributed acceleration measurements provides low-noise estimates of the three body-referred translational components of acceleration ($a_x$, $a_y$, $a_z$) along with the nine individual quantities of angular acceleration ($\dot{p}$, $\dot{q}$, $\dot{r}$, $p^2$, $q^2$, $r^2$, pq, pr, qr), where (p, q, r) the body-referred components of angular velocity are (roll rate, pitch rate, and yaw rate).

The total acceleration about each axis can be solved for by comparing measurements from different groups of accelerometers 206 placed away from the center of gravity of the airframe. If all accelerometers can exist on the same plane for a PCB solution (e.g., distributed acceleration sensing PCB assembly 200), the angular rates about the center of gravity are measured with a rate gyro 204. For example, Equation 1 provides an exemplary matrix equation for determining angular accelerations $\dot{q}_b$, $\dot{q}_b$, and $\dot{r}_b$ where the $a_{i-j}$ terms are differences in acceleration measurements between different accelerometer 206, $\Delta x_{i-j}$ and $\Delta y_{i-j}$ are distances between accelerometers 206 and the airframe's center of gravity, and $p_b$, $q_b$, and $r_b$ are the angular rates about the x, y, and z axes respectively.

Equation 1

$$\begin{bmatrix} 0 & 0 & \Delta y_{i-j} \\ 0 & 0 & \Delta x_{i-j} \\ \Delta y_{i-j} & \Delta x_{i-j} & 0 \end{bmatrix} \begin{bmatrix} \dot{p}_b \\ \dot{q}_b \\ \dot{r}_b \end{bmatrix} =$$

$$\begin{bmatrix} 1 & 0 & 0 & 0 & \Delta x_{i-j} & \Delta x_{i-j} & -\Delta y_{i-j} & 0 & 0 \\ 0 & 1 & 0 & \Delta y_{i-j} & 0 & \Delta y_{i-j} & -\Delta x_{i-j} & 0 & 0 \\ 0 & 0 & -1 & 0 & 0 & 0 & 0 & -\Delta x_{i-j} & -\Delta y_{i-j} \end{bmatrix}$$

$$\begin{bmatrix} a_{x,i-j} \\ a_{y,i-j} \\ a_{n,i-j} \\ p_b^2 \\ q_b^2 \\ r_b^2 \\ p_b q_b \\ p_b r_b \\ q_b r_b \end{bmatrix}$$

The first matrix on the right hand side of Equation 1 is not full rank, thus $\dot{q}_b$, $\dot{q}_b$, and $\dot{r}_b$ cannot be solved for with only two tri-axial accelerometers (one i, j pair). However, if measurements are compared between three independent tri-axial accelerometers 206, the result is nine equations accounting for each i, j pair of Equation 1. These equations can then be solved for three separate solutions of $\dot{q}_b$, $\dot{q}_b$, and $\dot{r}_b$ and combined using an estimator, such as a linear least squares solution, to calculate a final estimate of the angular acceleration. The addition of more i, j pair of accelerometers produces additional solutions for the angular acceleration that, when combined, result in a spatial average that reduces noise and increase accuracy without the latency of methods such as temporal averaging. The result is an effective, low-profile angular acceleration sensor using existing sensor components that can be readily integrated with an aircraft flight controller (e.g., autopilot). Additional advantages include the significant noise improvement without the latency and complexity associated with an observer or Kalman filter. The distributed and redundant nature of the acceleration measurements allows for an instantaneous spatial averaging that reduces noise while replacing the temporal averaging (and attendant latency and added complexity) of a Kalman filter.

The resultant distributed acceleration sensing system shows improved rejection of disturbances and gusts through feedback of angular acceleration components. Since the translational and angular components of acceleration are directly related to the applied moment, the effective instantaneous force and moment can be estimated and applied as feedback, eliminating the latency in the platform dynamics. Angular acceleration feedback can eliminate the need for separate angle of attack and sideslip sensors/measurements that are difficult to obtain in the thermal environment of a hypersonic missile. Distributed acceleration sensing system shows improved robustness to uncertainties in the aerodynamic models of the plant and actuators, and potentially the possibility of reduced levels of gain scheduling.

Any patents, patent publications, or articles cited herein are hereby incorporated by reference in their entirety. It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

While particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. An aerial vehicle comprising:
   an airframe;
   an aircraft flight controller to provide an output control signal; and
   a sensor package positioned on the airframe, the sensor package comprising a rate gyroscope, a plurality of accelerometers, and a processor, wherein the sensor package is configured to measure collectively at least nine independent axial acceleration measurements,
   wherein each of the plurality of accelerometers is positioned a predetermined distance from the center of gravity of the airframe,
   wherein the processor is configured to generate an actuation signal based at least in part on a feedback signal received from at least one of said rate gyroscope and said plurality of accelerometers,
   wherein the processor is configured to communicate the actuation signal to said aircraft flight controller,
   wherein the aircraft flight controller is configured to adjust the output control signal as a function of said actuation signal, and
   wherein the plurality of accelerometers is arranged in a circle with the rate gyroscope positioned substantially at the center of said circle.

2. The aerial vehicle of claim 1, wherein the rate gyroscope, the plurality of accelerometers, and the processor are positioned on a printed circuit board.

3. The aerial vehicle of claim 1, wherein the aircraft flight controller is configured to provide the output control signal to a propulsor or a flight control surface actuator.

4. The aerial vehicle of claim 1, wherein the rate gyroscope is positioned substantially at the center of gravity of the airframe.

5. The aerial vehicle of claim 1, wherein the at least nine independent axial acceleration measurements comprise three sets of three axial measurements, each of the three sets measured at a different location on the aerial vehicle, each of the three axial measurements within one of the three sets of three axial measurements measured along a different axis.

6. The aerial vehicle of claim 5, wherein the plurality of accelerometers comprises a tri-axial linear accelerometer to generate one of the three sets of three axial measurements.

7. The aerial vehicle of claim 1, wherein the processor is configured to estimate translational and rotational acceleration of the airframe based at least in part on the feedback signal to generate the actuation signal.

8. The aerial vehicle of claim 1, wherein the processor is configured to receive a second feedback signal from a strain gauge or a pressure sensor embedded within the aerial vehicle.

9. The aerial vehicle of claim 8, wherein the strain gauge or the pressure sensor is embedded in a wing of the aerial vehicle.

10. The aerial vehicle of claim 9, wherein the strain gauge is embedded at a leading edge of the wing.

11. The aerial vehicle of claim 1, wherein the processor is configured to calibrate the feedback signal using an estimation algorithm.

12. The aerial vehicle of claim 11, wherein the estimation algorithm is selected from the group consisting of: least squares; maximum likelihood estimation; and linear quadratic estimation.

13. The aerial vehicle of claim 1, wherein each of said plurality of accelerometers is a microelectromechanical system accelerometer.

14. A distributed acceleration sensing system for an aerial vehicle comprising:
a planar printed circuit board;
a rate gyroscope coupled to the planar printed circuit board;
a plurality of accelerometers coupled to the planar printed circuit board, wherein each of the plurality of accelerometers is spaced a predetermined distance from the rate gyroscope and configured to collectively measure at least three axial acceleration measurements taken at three different locations for each axis to yield at least nine independent axial acceleration measurements; and
a processor coupled to the planar printed circuit board, wherein the processor is operatively coupled with the rate gyroscope and each of the plurality of accelerometers and configured to generate an actuation signal based at least in part on a feedback signal received from at least one of said rate gyroscope and said plurality of accelerometers,
wherein the processor communicates the actuation signal to an aircraft flight controller of said aerial vehicle.

15. The distributed acceleration sensing system of claim 14, wherein the plurality of accelerometers includes a tri-axial linear accelerometer to generate one of said three sets of three axial measurements.

16. The distributed acceleration sensing system of claim 14, wherein the processor is configured to estimate translational and rotational acceleration of the aerial vehicle based on the feedback signal to generate the actuation signal.

17. The distributed acceleration sensing system of claim 14, wherein the processor is configured to receive a second feedback signal from a strain gauge or a pressure sensor embedded within the aerial vehicle.

18. The distributed acceleration sensing system of claim 14, wherein the rate gyroscope is positioned substantially at the center of gravity of the aerial vehicle.

19. An aerial vehicle comprising:
an airframe;
an aircraft flight controller to provide an output control signal; and
a sensor package positioned on the airframe, the sensor package comprising a rate gyroscope, a plurality of accelerometers, and a processor, wherein the sensor package is configured to measure collectively at least nine independent axial acceleration measurements,
wherein the rate gyroscope and the plurality of accelerometers are positioned in substantially the same plane and arranged such that a distance between each of the plurality of accelerometers and the rate gyroscope is the same,
wherein the processor is configured to generate an actuation signal based at least in part on a feedback signal received from at least one of said rate gyroscope and said plurality of accelerometers,
wherein the processor is configured to communicate the actuation signal to said aircraft flight controller, and
wherein the aircraft flight controller is configured to adjust the output control signal as a function of said actuation signal.

* * * * *